United States Patent

[11] 3,622,376

[72] Inventors Dale O. Tieszen;
James T. Edmonds, Jr., both of Bartlesville, Okla.
[21] Appl. No. 752,809
[22] Filed Aug. 15, 1968
[45] Patented Nov. 23, 1971
[73] Assignee Phillips Petroleum Company

[54] TIO₂ IN POLY(ARYLENE SULFIDE) FOR COATING COMPOSITION
12 Claims, 4 Drawing Figs.

[52] U.S. Cl. ........................................... 117/132 B, 117/161 R
[51] Int. Cl. .......................................... B44d 1/36, B32b 15/08
[50] Field of Search ............................. 117/132 B, 132 CF, 161 U, 161 Z; 260/41 B; 161/216

[56] References Cited
UNITED STATES PATENTS

| | | | |
|---|---|---|---|
| 2,538,941 | 1/1951 | Macallum | 260/79.1 X |
| 2,825,706 | 3/1958 | Sanders | 117/132 X |
| 2,893,906 | 7/1959 | Taylor | 117/132 X |
| 2,976,257 | 3/1961 | Dawe et al. | 117/132 X |
| 3,225,017 | 12/1965 | Seegman et al. | 117/132 X |
| 3,294,568 | 12/1966 | Gossman | 117/132 X |
| 3,318,714 | 5/1967 | Coney et al. | 117/132 UX |
| 3,354,129 | 11/1967 | Edmonds et al. | 260/37 X |
| 3,395,132 | 7/1968 | Smith | 117/132 X |
| 3,492,125 | 1/1970 | Ray | 117/161 X |

Primary Examiner—William D. Martin
Assistant Examiner—Harry J. Gwinnell
Attorney—Young and Quigg ABSTRACT: Normally solid poly(arylene sulfide) containing about 0.5 to about 50 weight percent TiO₂ is applied to a substrate to form a leveled coating without pinholes which is intimately bonded to the substrate. Preferably, the polymer-TiO₂ mixture is applied as a slurry in a carrier liquid such as ethylene glycol, methyl alcohol, water, toluene, and the like, or mixtures thereof, and thereafter heated to form a coating.

3,622,376

INVENTORS
D. O. TIESZEN
J. T. EDMONDS, JR.
BY Young + Quigg

ATTORNEYS

TIO IN POLY(ARYLENE SULFIDE) FOR COATING COMPOSITION

BACKGROUND OF THE INVENTION

This invention relates to improved poly (arylene sulfide) coatings. In a more specific aspect, it relates to normally solid poly (phenylene sulfide) coating compositions containing titanium dioxide.

Poly(arylene sulfides) such as poly(phenylene sulfide) are well known in the art for their high-temperature stability. While it is generally regarded in the art that these polymers can be adhered to metallic substrates, poly(arylene sulfide)-coated articles have not yet achieved significant commercial success. It has been found that, while poly(arylene sulfides) do adhere to metal substrates as alleged in the prior art, there are microscopic voids formed between the substrate and the polymer coating and surface imperfections which cannot necessarily be detected by ordinary means, but which have an effect on the ultimate value of the coated article as an item of commerce. For instance, a coated metallic item in which the coating is stuck tenaciously throughout most of the interface is still unsuitable as a protective coating for certain uses if there are microscopic areas where the protective coating is not intimately adhered, thus forming points for separation of the coating and the initiation of corrosion. Furthermore, in applications such as nonstick coatings for cooking utensils, for which poly(phenylene sulfide) and the like should be ideally suited because of its high-temperature stability and exceptional hardness, a surface is desirable which is not only glossy to the appearance, but which does not even contain microscopic voids or surface imperfections.

SUMMARY OF THE INVENTION

It is an object of this invention to provide an improved high-temperature coating composition; and it is a further object of this invention to provide a coating free of microscopic imperfections, which coating is uniformly adhered to a substrate.

In accordance with this invention, 0.5 to 50 weight percent of titanium dioxide is incorporated in poly(arylene sulfide) and this mixture applied as a coating to a substrate.

BRIEF DESCRIPTION OF THE DRAWINGS

In the figures, forming a part hereof.

DESCRIPTION OF THE PREFERRED EMBODIMENTS

Figure 1:
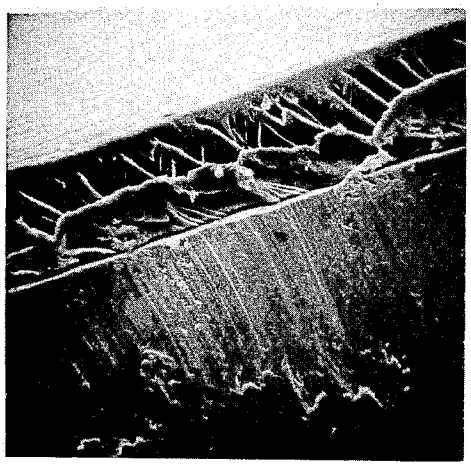
FIG. 1 is a photomicrograph of a cross section cut through an aluminum coupon having a poly(phenylene sulfide) coating.

Any normally solid poly(arylene sulfide) can be used in the practice of this invention. Suitable polymers are disclosed, for instance, in Edmonds, et al., U.S. Pat. No. 3,354,129, Nov. 21, 1967. The presently preferred polymer is poly(phenylene sulfide).

The term poly(arylene sulfide) is meant to include not only homopolymers, but also normally solid arylene sulfide copolymers, terpolymers, and the like. The poly(arylene sulfides) of this invention preferably will have an inherent viscosity in chloronaphthalene at 206° C. of at least 0.1, more preferably between 0.1 and 0.3, most preferably between 0.13 and 0.23.

Any titanium dioxide can be used. The presently preferred form is the rutile form. The titanium dioxide can be present in an amount within the range of 0.5 to 50 weight percent based on the total weight of the solids, that is, the weight of the poly(arylene sulfide) and the titanium dioxide. More preferably, the concentration of titanium dioxide will be within the range of 10 to 35 weight percent.

The coating is preferably applied in the form of a slurry of the poly(arylene sulfide) and titanium dioxide in an inert diluent. Any low boiling liquid can be used as the diluent. Preferred materials include ethylene glycol, methyl alcohol, water, and toluene, with ethylene glycol being the most preferred diluent. Certain high-boiling materials such as chlorinated biphenyl and dimethyl phthalate have been found to be less satisfactory.

The coating slurries of the instant invention can be applied by any conventional means such as spraying, smoothing with a doctor blade, and the like. It has been found that best results are obtained by smoothing the coating out with a doctor blade.

With steel and titanium, it has been found preferable to pretreat the metal by heating it to a temperature between about 650° F. and red heat, preferably about 675°–800° F. in an oven or else to expose it to a gas-oxygen flame until the metal turns bluish.

While this invention has been described primarily in terms of substrates such as steel, aluminum, and titanium, the invention is applicable to coatings on any substrate which is capable of withstanding the high temperatures required in heating to fuse and/or cure the poly(arylene sulfide). The compositions of this invention can be blended with conventional additives such as stabilizers, softeners, extenders, wetting agents, other polymers, other pigments, specific curing agents, and the like. The incorporation of from 0.5 to 50 weight percent, based on the weight of the poly(arylene sulfide), of a fluorocarbon polymer further enhances the nonstick quality of the compositions of the instant invention. Preferably, if a fluorocarbon is to be used, 5 to 20 weight percent of polytetrafluoroethylene is used.

During the fusing step after the coating has been applied, the solvent is first evaporated off, and then at about 550° F. the polymer melts and fuses together into a continuous coating. While cross-linking agents can be added, it is preferred to allow cross-linking to take place without specific additives for that purpose. The exact nature of the cross-linking reaction is not known, but it is known that it occurs much faster in the presence of air or oxygen than in an inert atmosphere. Preferably, the curing is done in air at a temperature of 550°–800° F., preferably 650°–750° F., for a time within the range of 1 minute to 5 hours, preferably 15 minutes to 2 hours. Of course, there is a relationship between time, temperature, and oxygen, and at higher temperatures and/or higher oxygen contents, the time can be reduced.

EXAMPLE I

A 26.6 weight percent slurry of poly(phenylene sulfide) (uncross-linked product having an inherent viscosity in chloronaphthalene of 0.2 at 206° C.) in ethylene glycol was stirred in a Waring blender for 15 minutes. Steel panels measuring 3×6 inches were pretreated at 700° F. for one-half hour, cooled, and coated with this slurry, using a drawbar. Three coats were applied, the coating being baked one-half hour at 700° F. after each coating.

Three coats of a similar slurry of the same poly(phenylene sulfide) in the same glycol, but having 25 weight percent rutile $TiO_2$ (based on the weight of poly(phenylene sulfide) and $TiO_2$) were applied to identical steel slabs in an identical manner and cured in an identical manner as above. The results were as follows:

| $TiO_2$, wt. % | Reverse Impact, in.-lb.* |
|---|---|
| 0 | <100 |
| 25 | >160 |

*Gardner Laboratories Reverse Impact Tester. This equipment comprises a rounded tip which rests above the sample on the reverse side from the coating. A ram is raised a calibrated distance and dropped against the tip which then impinges on the back side of the coated slab. The side opposite that which comes in contact with the tip, that is, the side having the coating, is examined for cracks and looseness of the coating.

EXAMPLE II

Slurries of various solids in poly(phenylene sulfide) were applied to steel coupons in a manner similar to that used in example I. The results were as follows:

| Pigment | Percent, based on weight of solids | Reverse Impact, in.-lb. |
| --- | --- | --- |
| SiO** | 37 | 100 |
| Magnesium Silicate | 33 | 36 |

** Ludox Colloidal Silica

Other oxides of silica and magnesium silicates such as talc were tried and found to give similar results to those shown in example II.

Figure 2:
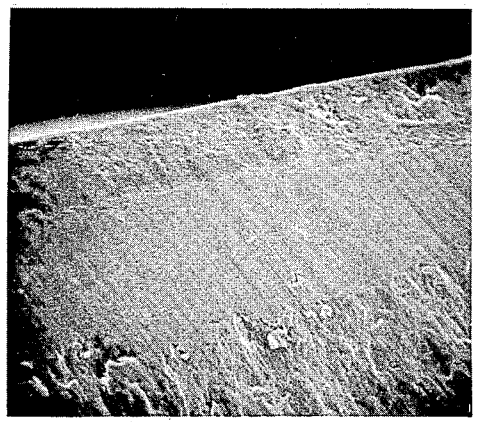
FIG. 2 is a photomicrograph similar to that of FIG. 1 except that the poly(phenylene sulfide) coating contained 25 weight percent titanium dioxide.

Referring now to the drawings, FIGS. 1 and 2 are photomicrographs of cross sections cut through an aluminum coupon having a poly(phenylene sulfide) coating. The magnification is 240. The poly(phenylene sulfide) coating is identical in the two figures except that in FIG. 1 no TiO was present, whereas in FIG. 2 the poly(phenylene sulfide) contained 25 percent TiO. While the gross physical properties of both the coatings shown in FIG. 1 and FIG. 2 would have indicated that the coatings were adhered well, it is noted that a microscopic examination reveals that there are, in the coating containing no TiO, areas which are not adhered to the substrate.

Figure 3:
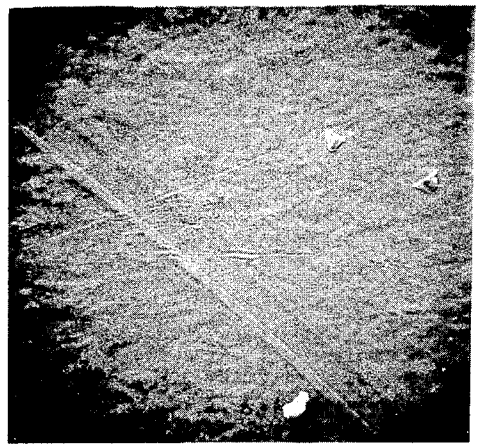
FIG. 3 is a photomicrograph of the surface of a poly(phenylene sulfide) coating.
Figure 4:
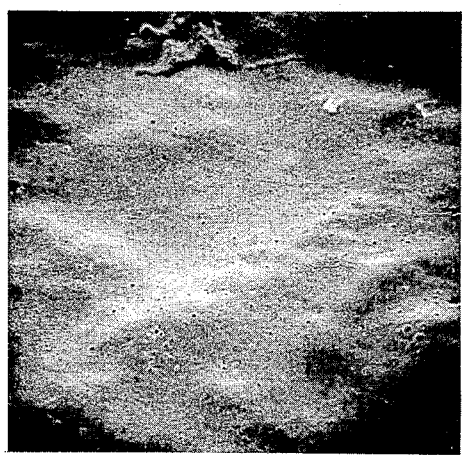
FIG. 4 is a photomicrograph of the surface of a poly(tetrafluoroethylene) coating.

FIGS. 3 and 4 are photomicrographs taken with an electron scanning microscope of the surface of polymer coatings. Magnification in FIG. 3 is 190 and in FIG. 4, . The coating of FIG. 3 is poly(phenylene sulfide) plus TiO. The coating of FIG. 4 is poly(tetrafluoroethylene). While both the poly(tetrafluoroethylene) coating and the poly(phenylene sulfide) coating appeared glossy and smooth to the naked eye, these photographs indicate that the poly(phenylene sulfide) containing TiO is exceptionally smooth and crater free, while the poly(tetrafluoroethylene) surface exhibits numerous craters. In all of these figures, the substrate was aluminum. Further magnification to over 1200X showed the craters of the poly(tetrafluoroethylene) in clear detail; no craters of any size were detectable in the poly(phenylene sulfide) coating of the invention, even at 1200X magnification.

EXAMPLE III

A poly(phenylene sulfide) formulation similar to that of example I containing TiO was applied to a titanium substrate and the resulting coating was found to have a smooth glossy appearance and to be intimately adhered to the substrate.

While this invention has been described in detail for the purpose of illustration, it is not to be construed as limited thereby, but is intended to cover all changes and modifications within the spirit and scope thereof.

We claim:

1. A coated article comprising: a substrate having a coating consisting essentially of normally solid poly(arylene sulfide), and poly(arylene sulfide) having between 10 and 50 weight percent TiO based on the total weight of poly(arylene sulfide) and TiO.

2. A coated article according to claim 1 wherein said coating comprises in addition 0.5 to 50 weight percent, based on the weight of said poly(arylene sulfide) of a fluorocarbon polymer.

3. A coated article according to claim 1 wherein said poly(arylene sulfide) is poly(phenylene sulfide) and said substrate is steel.

4. A coated article according to claim 3 wherein said TiO is in the rutile form.

5. A coated article according to claim 1 wherein said poly(arylene sulfide) is present in an amount within the range of 10 to 35 weight percent.

6. A coated article according to claim 5 wherein said article has reverse-impact strength of greater than 160 in./lbs.

7. A coating process comprising: applying as a coating a substrate a formulation consisting essentially of normally solid poly(arylene sulfide) and between 10 and 50 weight percent TiO based on the total weight of the poly(arylene sulfide) and TiO and heating said coating in the presence of oxygen to a temperature of 500–800 F. for a time within the range of 1 minute to 5 hours to fuse and cure said poly(arylene sulfide).

8. A process according to claim 7 wherein said poly(arylene sulfide) and TiO formulation is applied in the form of a slurry in a diluent.

9. A process according to claim 7 wherein said formulation comprises in addition 0.5 to 50 weight percent, based on the weight of said poly(arylene sulfide), of a fluorocarbon polymer.

10. A method according to claim 7 wherein said titanium dioxide is present in an amount within the range of 10 to 35 weight percent.

11. A process according to claim 7 wherein said poly(arylene sulfide) is poly(phenylene sulfide).

12. A process according to claim 11 wherein said substrate is steel.

* * * * *

18820

UNITED STATES PATENT OFFICE

CERTIFICATE OF CORRECTION

Patent No. 3,622,376    Dale O. Tieszen et al    Dated: November 23, 1971

It is certified that error appears in the above-identified patent and that said Letters Patent are hereby corrected as shown below:

Column 3, lines 23, 25, 29, 34, and 39, "TiO" should be "$TiO_2$"; Column 4, line 1, "TiO" should be "$TiO_2$"; line 10, delete "and" first occurrence and insert therefor --- said ---; lines 12 and 13, "TiO" should be "$TiO_2$"; line 21, "TiO" should be "$TiO_2$"; line 28, after "coating" and before "a" (second occurrence) insert --- to ---; lines 31 and 32, "TiO" should be "$TiO_2$"; line 33, "500-800 F." should read "500-800°F."; line 36, "TiO" should be "$TiO_2$".

Signed and sealed this 4th day of July 1972.

(SEAL)
Attest:

EDWARD M. FLETCHER, JR.
Attesting Officer

ROBERT GOTTSCHALK
Commissioner of Patents